(12) United States Patent
Yamato

(10) Patent No.: US 10,896,347 B2
(45) Date of Patent: Jan. 19, 2021

(54) DATAFLOW CONTROL APPARATUS AND DATAFLOW CONTROL METHOD FOR METADATA MATCHING AND DEVICE EXTRACTION

(71) Applicant: OMRON Corporation, Kyoto (JP)

(72) Inventor: Tetsuji Yamato, Kyoto (JP)

(73) Assignee: OMRON Corporation, Kyoto (JP)

( * ) Notice: Subject to any disclaimer, the term of this patent is extended or adjusted under 35 U.S.C. 154(b) by 86 days.

(21) Appl. No.: 15/780,225

(22) PCT Filed: Nov. 4, 2016

(86) PCT No.: PCT/JP2016/082846
§ 371 (c)(1),
(2) Date: May 30, 2018

(87) PCT Pub. No.: WO2017/104287
PCT Pub. Date: Jun. 22, 2017

(65) Prior Publication Data
US 2018/0373956 A1 Dec. 27, 2018

(30) Foreign Application Priority Data
Dec. 14, 2015 (JP) ................. 2015-243404

(51) Int. Cl.
*G06F 15/173* (2006.01)
*G06K 9/62* (2006.01)
(Continued)

(52) U.S. Cl.
CPC ......... *G06K 9/6201* (2013.01); *G06F 16/907* (2019.01); *H04L 67/12* (2013.01); *H04L 67/2804* (2013.01); *H04W 4/38* (2018.02)

(58) Field of Classification Search
CPC ...... G06K 9/6201; H04M 11/00; G06F 13/00; G06F 9/54; G06F 16/907; H04L 67/2804; H04L 67/12; H04W 4/38
(Continued)

(56) References Cited

U.S. PATENT DOCUMENTS

2007/0251998 A1* 11/2007 Belenki ................. G06N 3/126
235/380
2008/0164997 A1 7/2008 Aritsuka et al.
(Continued)

FOREIGN PATENT DOCUMENTS

EP 2801962 A1 11/2014
EP 2940601 A1 11/2015
(Continued)

OTHER PUBLICATIONS

Takuya Nagai, "Study on Construction and Management of Distributed Database for Sensor Data Servers" IPSJ SIG Technical Report, Oct. 17, 2013, vol. 2013-SE-182, No. 23, p. 1 to p. 8 (Relevance is indicated in the (translated) ISR/WO of PCT/JP2016/082846 mailed on Nov. 29, 2016.).
(Continued)

*Primary Examiner* — Johnny B Aguiar
(74) *Attorney, Agent, or Firm* — Metrolex IP Law Group, PLLC

(57) ABSTRACT

A dataflow control apparatus extracts a device capable of providing data that satisfies requirements of an application by matching device-side metadata and app-side metadata. The device-side metadata is capable of describing information indicating a history of data that a device provides, and the app-side metadata is capable of describing information indicating a history of data that an application requires. The dataflow control apparatus, in a case where the information indicating the history is described in the app-side metadata,
(Continued)

extracts a device capable of providing data that satisfies at least both the specification and the history that the application requires from among a plurality of the devices.

10 Claims, 7 Drawing Sheets

(51) Int. Cl.
  *G06F 16/907* (2019.01)
  *H04L 29/08* (2006.01)
  *H04W 4/38* (2018.01)

(58) Field of Classification Search
  USPC .................................................. 709/223, 224
  See application file for complete search history.

(56) References Cited

U.S. PATENT DOCUMENTS

| | | | |
|---|---|---|---|
| 2008/0243440 A1* | 10/2008 | Matsumoto | H04L 41/50 702/188 |
| 2011/0289133 A1* | 11/2011 | Shikano | H04L 67/12 709/202 |
| 2014/0023096 A1* | 1/2014 | Czompo | H04J 3/025 370/537 |
| 2014/0359133 A1* | 12/2014 | Tian | H04L 47/72 709/226 |
| 2014/0372561 A1 | 12/2014 | Hisano | |
| 2015/0003473 A1 | 1/2015 | Park et al. | |
| 2015/0229643 A1* | 8/2015 | Kiriyama | H04L 63/10 726/4 |
| 2015/0245212 A1 | 8/2015 | Kawamura | |
| 2016/0299902 A1 | 10/2016 | Uenoyama et al. | |

FOREIGN PATENT DOCUMENTS

| | | |
|---|---|---|
| JP | 2007-300571 A | 11/2007 |
| WO | 2014/030510 A1 | 2/2014 |
| WO | 2014-041826 A1 | 3/2014 |
| WO | 2014-045699 A1 | 3/2014 |
| WO | 2015-182416 A1 | 12/2015 |

OTHER PUBLICATIONS

An English translation of the International Search Report of PCT/JP2016/082846 dated Nov. 29, 2016.
An English translation of the Written Opinion of PCT/JP2016/082846 dated Nov. 29, 2016.
Masato Yamanouchi et al., "Auto Configuration Method for Sensor Location", Multimedia, Distributed, Cooperative, and Mobile Symposium (DICOMO2007), Symposium proceedings, Information Processing Society of Japan Symposium Series, Jul. 4, 2007, p. 60-65, vol. 2007 No. 1, General incorporated association of Information Processing Society of Japan, Japan Relevance is indicated in JPOA issued on Nov. 13, 2018.
The Japanese Office Action dated Nov. 13, 2018 in a counterpart Japanese patent application.
Panagiotis Karkazis et al., "Resource and service virtualisation in M2M and IoT platforms", International Journal of Intelligent Engineering Informatics, Jan. 1, 2015, vol. 3, No. 2/3, Relevance is indicated in EESR issued on Jul. 12, 2019.
The extended European search report (EESR) dated Jul. 12, 2019 in a counterpart European patent application.
Tetsuya Nakamura et al., Context Handling Architecture for Adaptive Networking Services, IPSJ SIG Technical Report, Feb. 4, 2000, p. 83-90, vol. 2000, No. 14, Incorporated Information Processing Society of Japan, Japan.
The Japanese Office Action dated Jul. 17, 2018 in a counterpart Japanese patent application.

\* cited by examiner

FIG. 2A

Sensor-side Metadata Management Table

| Sensor ID | Sensor Class | Sensor Type | Network Address | Sensing Object | Sensing Area | Sensing Time | Data Type | Range of Use | Price | Data History | ... |
|---|---|---|---|---|---|---|---|---|---|---|---|
| R001 | real sensor | temperature sensor | ... | outside air | front of Kyoto Station | 00:00-24:00 | temperature | business | ≥100 yen | aa1 from A company | ... |
| R002 | real sensor | image sensor | ... | intersection | Tokyo A intersection | 00:00-24:00 | still image/ moving image | academic | ≥10 yen | xx1 from X company | ... |
| ... | ... | ... | ... | ... | ... | ... | ... | ... | ... | ... | ... |
| V001 | virtual sensor | speed sensor | ... | passing vehicles | Tokyo road b/w AB | 00:00-24:00 | speed | unrestricted | ≥50 yen | yy1 from Y company | ... |
| ... | ... | ... | ... | ... | ... | ... | ... | ... | ... | ... | ... |

FIG. 2B

APP-side Metadata Management Table

| App ID | App Type | Network Address | Sensing Object | Sensing Area | Sensing Time | Data Type | Range of Use | Price | Data History |
|---|---|---|---|---|---|---|---|---|---|
| A001 | traffic congestion prediction | ... | intersection | Tokyo A intersection | 09:00, 12:00, 15:00 | image | business | ≤150 yen | - |
| A002 | weather app | ... | outside air | front of Kyoto Station | 10:00, 17:00 | temperature | business | ≤200 yen | aa1 from A company, aa2 from A company, or bb1 from B company |
| ... | ... | ... | ... | ... | ... | ... | ... | ... | ... |

Data History Setting Screen for Sensor-side Metadata

| Sensor Manufacturer | Sensor Model | Data Provider | Digital Certificate |
|---|---|---|---|
| A Company | aa1<br>aa2<br>aa3<br>: : : | O Company | Issuer: CA Certificate Authority<br>Digital Certificate: abcdef<br>Valid to: 2015/11/09 |

FIG. 3A

Data History Setting Screen for App-side Metadata

Sensor Manufacturer
☑ A Company
☑ B Company
☐ C Company
☐ D Company
· · ·

Sensor Model
A Company | B Company
aa1 | bb1
aa2 | bb2
aa3 | bb3
· · · | · · ·

Data Provider
not specified

Digital Certificate
● Mandatory ○ Optional
Issuer : not specified

| Dataflow Control Command ID | Sensor ID | Network Address of Sensor | App ID | Network Address of App | Time Information |
|---|---|---|---|---|---|
| C003 | R001 | ... | A002 | ... | 10:00, 17:00 |

DATAFLOW CONTROL APPARATUS AND DATAFLOW CONTROL METHOD FOR METADATA MATCHING AND DEVICE EXTRACTION

TECHNICAL FIELD

The present invention relates to a technology for controlling a dataflow that provides data obtained in a device such as a sensor to an application that uses the data.

RELATED ART

Currently, an IT environment called M2M Cloud is attracting attention. M2M (Machine to Machine) refers to a system in which machines having various applications, sizes and performances exchange information over a network. By using this information, appropriate control of each machine and situation analysis of the real world become possible. As a result of factors such as improvement in wireless communication technologies that support M2M, miniaturization of machines and cost reductions, expectations for implementation are building.

M2M Cloud is the platform that realizes such M2M technologies in a cloud computing environment. This provides basic functions required in M2M, such as services ranging from data collection and storage to processing and analysis, as applications on a cloud, enabling use from anywhere. Collective management of data can enhance reliability and completeness. Also, for users, there is the advantage of being able to use as much collected data and as many computer resources as needed. Thus, it is possible to analyze big data and obtain added value without building a system individually, and application in a wide range of fields is expected.

Also, as shown in Patent Document 1, a technology called a sensor network is being investigated. This technology enables collection, management and seamless use of sensing data, by installing sensor devices (hereinafter, also referred to simply as "sensors") having a sensing function and a communication function in various locations, movable bodies, industrial facilities and the like, and networking these sensors.

Usually, sensors are installed in order to collect data that is required by the entity that owns the sensors. Thus, it is often the case that the sensing data is not used (the sensors themselves are not operating or the sensing data is not used even when the sensors are operating) except when data is collected by the entity that owns the sensors. Thus, the distributability of the sensing data is low, and no matter how significant the data is to a third party, analysis and use is limited to the entity that owns the sensors. As a result, this leads to overlapping investment of facilities and network congestion due to communication with individually installed sensors.

Also, a technology called IoT (Internet of Things) is being investigated. This technology produces new value by combining information relating to many things that exist in the world over a network, and seamless deployment of various services including social infrastructure is expected. In order to produce value from IoT, the condition of the things that are connected to the network needs to be known, and sensing and communication are thus important element technologies.

RELATED ART DOCUMENTS

Patent Documents

Patent Document 1: JP 2007-300571A
Patent Document 2: WO 2014/041826

SUMMARY OF THE INVENTION

Problems to be Solved by the Invention

The applicant of the present invention, in order to realize a mechanism for appropriately distributing information resources such as sensing data in IoT, investigated a system that specifies a sensor capable of acquiring sensing data that satisfies the requirements of an application that uses the sensing data and controls the dataflow from the sensor to the application, by matching "sensor-side metadata" that describes information relating to the sensor with "app-side metadata" that describes information relating to the application (see Patent Document 2). According to this mechanism, mediation between providers and users of data can be automated, and promotion of the distribution and utilization of sensing data can be expected.

When the data distribution market expands and the number of data providers and sensors increases, it is predicted that similar data will be provided by a plurality of entities. Such a situation will involve, for example, the Japan Meteorological Agency providing air temperature data for Kyoto measured with a temperature sensor x from X company, a private sector contractor A providing air temperature data for Kyoto measured with a temperature sensor y from Y company, and an individual B providing air temperature data for Kyoto measured with a temperature sensor z from Z company. Although all of the data measures the air temperature for Kyoto, factors such as the measurers, the measurement methods and the sensors that are used in measurement differ, and thus differences naturally appear in the accuracy and quality of the data. In such a case, the data user would be expected to want to use data that best matches the purpose of use and the application of the data. For example, in the case where the data user performs precise data analysis in an application, it is highly likely that the accuracy and quality required of the original data will be high. On the other hand, clarifying the accuracy and quality of the data that is provided is considered to also be important from the viewpoint of transaction security and data quality assurance. However, conventional (Patent Document 2) sensor-side metadata is confined to enabling the reliability of sensing data to be set. Reliability is likely to be defined by the outcome of a relative evaluation or a subjective evaluation such as "high" and low", and is inadequate as information for assuring the accuracy and quality of sensing data absolutely and objectively.

Note that although a sensor network has been given as an example in the foregoing description, exactly the same issues can also arise with a network in which data that is output (provided) by a device other than a sensor is distributed. As a device other than a sensor, any device that outputs data of some kind is applicable, such as an actuator, a controller, a computer, a household electrical appliance, a wearable terminal, an automatic ticket gate, a vending machine or an ATM, for example. In this specification, the term "device" is used as a concept that encompasses these apparatuses (including sensors), and a network that distributes data output (provided) by such a device is called a "device network". The various types of devices illustrated above can exist together and be connected in the device network.

The present invention was made in view of the above circumstances, and an object thereof is to provide a technology for assuring the accuracy and quality of data transacted in a data distribution market, and improving the security and reliability of data transactions.

Means for Solving the Problems

The invention according to an aspect 1 is a dataflow control apparatus including a device-side metadata storage unit configured to store, for each of a plurality of devices, device-side metadata including at least information that indicates a specification of data that the device provides, an app-side metadata storage unit configured to store, for an application that uses data to provide a service, app-side metadata including at least information that indicates a specification of data that the application requires, a matching unit configured to extract a device capable of providing data that satisfies the specification that the application requires from among the plurality of the devices, by matching the app-side metadata and the device-side metadata, and a dataflow control unit configured to perform dataflow control that provides data output from the extracted device to the application, based on a result of the matching by the matching unit, in the device-side metadata, information indicating a history of the data provided by the device being able to be described, in the app-side metadata, information indicating a history of the data required by the application being able to be described, and the matching unit, in a case where the information indicating the history is described in the app-side metadata, being configured to extract a device capable of providing data that satisfies at least both the specification and the history that the application requires from among the plurality of the devices.

According to the invention of the aspect 1, information (hereinafter, "data history information") indicating the history of data can be described in metadata, and this data history information can be used as one item for matching data providers and data users. Knowledge of information such as the derivation, development and source of the data, for example, obtained from the data history information serves as effective material for data users when judging criteria such as the accuracy, quality, reliability and security of the data. On the other hand, for data providers, by disclosing the data history information, there is the advantage of being able to assure criteria such as the accuracy, quality, reliability and security of the data, and enhance the commodity value of the data. Accordingly, by using metadata describing data history information, the accuracy and quality of data transacted in a data distribution market can be assured, and the security and reliability of data transactions can be improved.

The invention according to aspect 2 is the dataflow control apparatus according to claim 1 characterized by the information indicating the history of the data including at least any of information specifying a manufacturer or a seller of the device that provides the data, information specifying a make or a model of the device that provides the data, and information specifying an owner or an administrator of the device that provides the data.

According to the invention of the aspect 2, by referring to the data history information, at least one of the manufacturer of the device, the seller of the device, the make of the device, the model of the device, the owner of the device and the administrator of the device can be known. For example, since the accuracy and characteristics of data are considered to be greatly affected by the performance of the device that provides the data, information such as the manufacturer, the seller, the make and the model of the device is helpful in judging the reliability of the data. Also, from the viewpoint of the quality assurance of data, criteria such as how good or bad the organization, administration, management and maintenance on the data provider-side are also exert an influence, and thus information about parties such as the owner or administrator of the device is also helpful in judging the reliability of the data.

The invention according to aspect 3 is the dataflow control apparatus according to claim 1 or 2 characterized by the information indicating the history of the data including certification information certifying that the data, the device that provides the data, a provider of the data or an owner or an administrator of the device that provides the data conforms to a predetermined standard.

According to the invention of the aspect 3, it is certified by the certification information included in the data history information that the data, the device, the data provider or the owner or administrator of the device conforms to a predetermined standard, thus enabling the accuracy and quality of the data to be assured and the security and reliability of data transactions to be improved.

The invention according to aspect 4 is the dataflow control apparatus according to claim 3 characterized by the certification information being a digital certificate issued by a third party certificate authority.

According to the invention of the aspect 4, a digital certificate issued by a third party certificate authority is used, thus enabling the accuracy and quality of the data to be objectively assured and the security and reliability of data transactions to be further improved.

The invention according to aspect 5 is the dataflow control apparatus according to any one of claims 1 to 3 characterized by the device being a sensor configured to output sensing data.

The invention according to aspect 6 is a dataflow control method including steps of acquiring, by a computer, for each of a plurality of devices, device-side metadata including at least information that indicates a specification of data that the device provides, from a device-side metadata storage unit configured to store the device-side metadata, acquiring, by the computer, for an application that uses data to provide a service, app-side metadata including at least information that indicates a specification of data that the application requires, from an app-side metadata storage unit configured to store the app-side metadata, extracting, by the computer, a device capable of providing data that satisfies the specification that the application requires from among the plurality of devices, by matching the app-side metadata and the device-side metadata, and performing, by the computer, dataflow control that provides data output from the extracted device to the application, based on a result of the matching, in the device-side metadata, information indicating a history of the data provided by the device being able to be described, in the app-side metadata, information indicating a history of the data required by the application being able to be described, and, in the matching step, in a case where the information indicating the history is described in the app-side metadata, a device capable of providing data that satisfies at least both the specification and the history that the application requires being extracted from among the plurality of the devices.

According to the invention of the aspect 6, information (hereinafter, "data history information") indicating the history of data can be described in metadata, and this data history information can be used as one item for matching data providers and data users. Knowledge of information such as the derivation, development and source of the data, for example, obtained from the data history information serves as effective material for data users when judging criteria such as the accuracy, quality, reliability and security of the data. On the other hand, for data providers, by disclosing the data history information, there is the advantage of being able to assure criteria such as the accuracy, quality, reliability and security of the data, and enhance the commodity value of the data. Accordingly, by using metadata describing data history information, the accuracy and quality of data transacted in a data distribution market can be assured, and the security and reliability of data transactions can be improved.

The invention according to aspect 7 is a program that causes a computer to execute the steps of the dataflow control method according to the aspect 6.

According to the invention of the aspect 7, information (hereinafter, "data history information") indicating the history of data can be described in metadata, and this data history information can be used as one item for matching data providers and data users. Knowledge of information such as the derivation, development and source of the data, for example, obtained from the data history information serves as effective material for data users when judging criteria such as the accuracy, quality, reliability and security of the data. On the other hand, for data providers, by disclosing the data history information, there is the advantage of being able to assure criteria such as the accuracy, quality, reliability and security of the data, and enhance the commodity value of the data. Accordingly, by using metadata describing data history information, the accuracy and quality of data transacted in a data distribution market can be assured, and the security and reliability of data transactions can be improved.

The invention according to aspect 8 is a data structure of device-side metadata that describes information relating to data that a device provides, the data structure including information indicating a specification of the data that the device provides, and information indicating a history of the data that the device provides, the device-side metadata being used in matching that extracts a device capable of providing data that satisfies both a specification and a history that an application that uses data requires from among a plurality of devices.

According to the invention of the aspect 8, device-side metadata is capable of describing information (hereinafter, "data history information") indicating the history of data, and this data history information can be used as one item for matching data providers and data users. Knowledge of information such as the derivation, development and source of the data, for example, obtained from the data history information serves as effective material for data users when judging criteria such as the accuracy, quality, reliability and security of the data. On the other hand, for data providers, by disclosing the data history information, there is the advantage of being able to assure criteria such as the accuracy, quality, reliability and security of the data, and enhance the commodity value of the data. Accordingly, by using metadata describing data history information, the accuracy and quality of data transacted in a data distribution market can be assured, and the security and reliability of data transactions can be improved.

The invention according to aspect 9 is a data structure of app-side metadata that describes information relating to data that an application seeks to use, the data structure including information indicating a specification of the data that the application requires, and information indicating a history of the data that the application requires, the app-side metadata being used in matching that extracts a device capable of providing data that satisfies both the specification and the history that the application requires from among a plurality of devices.

According to the invention of the aspect 9, app-side metadata is capable of describing information (hereinafter, "data history information") indicating the history of data, and this data history information can be used as one item for matching data providers and data users. Data users, by designating the data history information, are able to use reliable data on the derivation, development and source, for example. Accordingly, by using metadata describing data history information, the accuracy and quality of data transacted in a data distribution market can be assured, and the security and reliability of data transactions can be improved.

The invention according to aspect 10 is the data structure according to claim 8 or 9 characterized by the information indicating the history of the data including at least any of information specifying a manufacturer or a seller of the device that provides the data, information specifying a make or a model of the device that provides the data, and information specifying an owner or an administrator of the device that provides the data.

According to the invention of the aspect 10, by referring to the data history information, at least one of the manufacturer of the device, the seller of the device, the make of the device, the model of the device, the owner of the device and the administrator of the device can be known. For example, since the accuracy and characteristics of data are considered to be greatly affected by the performance of the device that provides the data, information such as the manufacturer, the seller, the make and the model of the device is helpful in judging the reliability of the data. Also, from the viewpoint of the quality assurance of data, criteria such as how good or bad the organization, administration, management and maintenance on the data provider-side are also exert an influence, and thus information about parties such as the owner or administrator of the device is also helpful in judging the reliability of the data.

The invention according to aspect 11 is the data structure according to any one of claims 8 to 10 characterized by the information indicating the history of the data including certification information certifying that the data, the device that provides the data, a provider of the data or an owner or an administrator of the device that provides the data conforms to a predetermined standard.

According to the invention of the aspect 11, it is certified by the certification information included in the data history information that the data, the device, the data provider or the owner or administrator of the device conforms to a predetermined standard, thus enabling the accuracy and quality of the data to be assured and the security and reliability of data transactions to be improved.

The invention according to aspect 12 is the data structure according to claim 11 characterized by the certification information is a digital certificate issued by a third party certificate authority.

According to the invention of the aspect 12, a digital certificate issued by a third party certificate authority is used, thus enabling the accuracy and quality of the data to be objectively assured and the security and reliability of data transactions to be further improved.

A "device" in the present invention means all devices that output (provide) data of some kind, examples of which include sensors, actuators, controllers, computers, household electrical appliances, wearable terminals, automatic ticket gates, vending machines and ATMs. Above all, the present invention is preferably applied to a sensor network that distributes sensing data output from a sensor.

Note that the present invention can be regarded as a dataflow control apparatus that has at least a part of the above configurations or functions. The present invention can also be regarded as a device network system that has the dataflow control apparatus. The present invention can also be regarded as a dataflow control method that includes at least a part of the above processing, a program for causing a computer to execute this method, or a computer-readable recording medium on which such a program is recorded in a non-transitory manner. The present invention can also be regarded as a control command datastream for controlling the above dataflow. The present invention can be configured by combining the various configurations and processing that are described above as long as there are no technical inconsistencies.

Effects of the Invention

According to the present invention, the accuracy and quality of data transacted in a data distribution market can be assured, and the security and reliability of data transactions can be improved.

BRIEF DESCRIPTION OF THE DRAWINGS

FIG. 2A is a diagram showing an example of a sensor-side metadata management table, and FIG. 2B is a diagram showing an example of an app-side metadata management table.

FIG. 3A is a diagram showing an example of a data history setting screen for sensor-side metadata, and FIG. 3B is a diagram showing an example of a data history setting screen for app-side metadata.

FIG. 5 is a diagram showing an example of a dataflow control command.

EMBODIMENTS OF THE INVENTION

Figure 1:
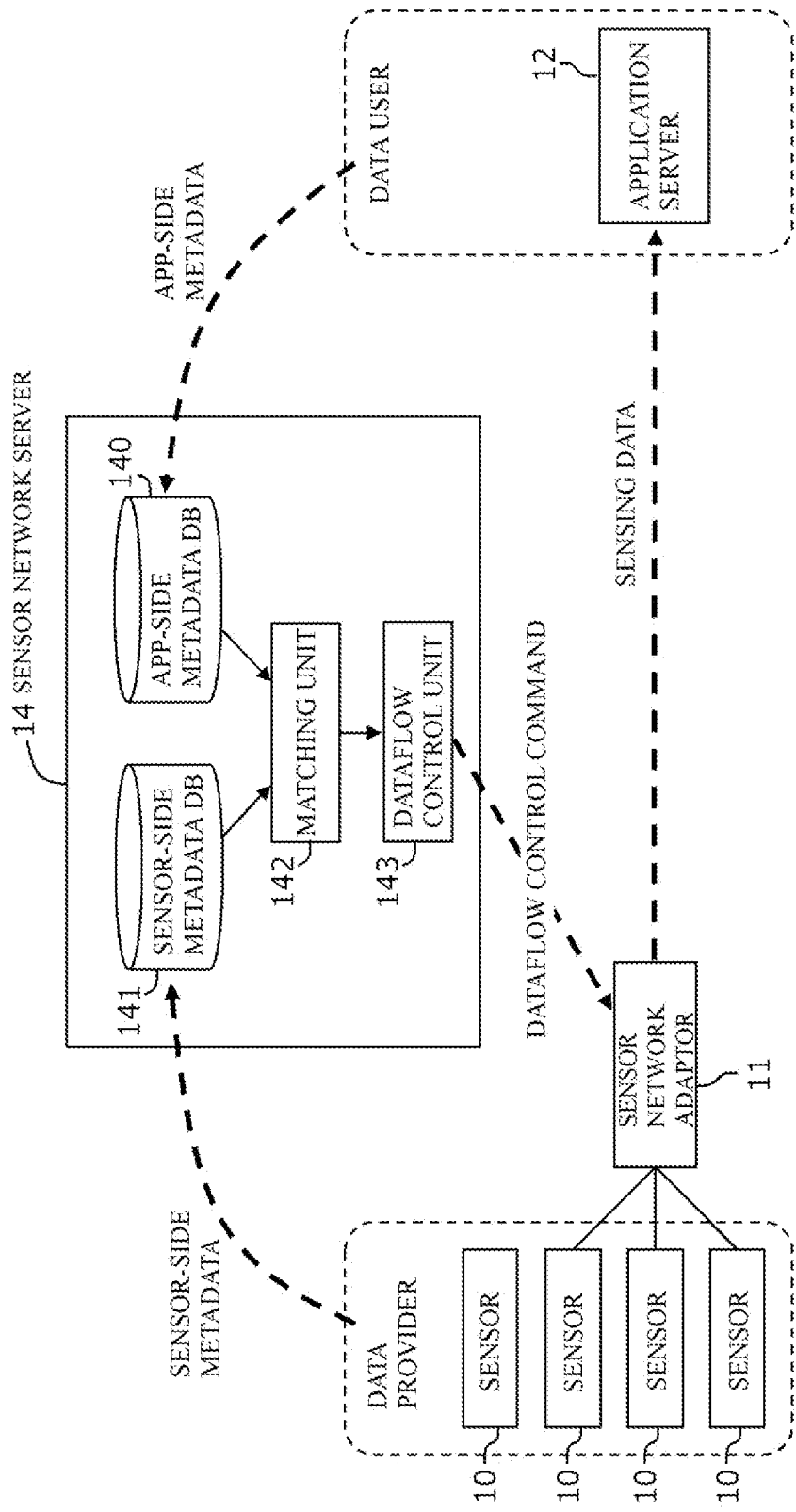
FIG. 1 is a diagram showing the overall configuration of a sensor network system.

Hereinafter, a preferred embodiment of the present invention will be described, with reference to the drawings. Description of configurations that is given below can be appropriately changed depending on the configuration of the system and various conditions to which the invention is applied, and it is not intended to limit the scope of this invention to the following description.

The embodiment discussed below describes an example in which the present invention is applied to a sensor network system that uses M2M Cloud. By realizing this mechanism, anyone in any location becomes able to easily acquire desired information from a diverse range of information that is obtained from the large number of sensors that exist in a sensor network, and it is expected that effective use of sensors (resources) and distribution of sensing data from data providers to data users will be promoted. This system can be applied and deployed to various applications, such as a traffic control system that is based on sensing data of traffic conditions, a weather forecasting system that is based on environmental sensing data, various types of analytical systems that use big data, and a maintenance service for sensors sold by sensor manufacturers, for example.

Overall System Configuration

The overall configuration of a sensor network system according to the embodiment of the present invention will be described, with reference to FIG. 1. This sensor network system is a system for controlling the distribution of sensing data from data providers to data users, and has, in summary, a plurality of sensors 10, a sensor network adaptor 11 which is an apparatus that manages the sensors 10, a plurality of application servers 12 having applications that use sensing data to provide services, and a sensor network server 14 serving as dataflow control apparatus that administers mediation between providers and users of sensing data.

The apparatuses are communicably connected by a wide area network such as the Internet or by a LAN. Note that the network is not limited to a single network, and may be conceived as a conceptual entity in which a plurality of networks having various communication methods and topologies are interconnected. In short, any form of network capable of realizing transmission and reception of sensing data and transmission and reception of data such as metadata and dataflow control commands related to distribution of sensing data may be used.

Sensors

The sensors 10 are devices that detect the physical quantity of a sensing object and changes therein, and outputs detected data as sensing data. The sensor 10 include "real sensors" which are sensors having physical substance, and "virtual sensors" which are functional modules that generate new data by performing processing, analysis and the like of sensing data that is obtained from one or more original sensors, and output the generated new data as virtual sensing data. In the present specification, virtual and real sensors may be simply described as "sensors" in contexts where it is not necessary to distinguish therebetween.

The sensors 10 are, for example, sensors such as image sensors (surveillance cameras, etc.), temperature sensors, humidity sensors, illuminance sensors, force sensors, sound sensors, RFID sensors, infrared sensors, attitude sensors, rainfall sensors, radioactivity sensors, gas sensors, acceleration sensors, gyroscopes and GPS sensors. Also, since devices such as mobile phones, smartphones, tablet terminals, mobile PCs and drones are equipped with various types of sensors, these devices can also be regarded as real sensors. In the sensor network system of the present embodiment, any type of sensor can be connected, including the sensors illustrated here. Also, large numbers of sensors are already installed for various applications and purposes in all manner of locations throughout world, such as for FA and production management of factories, urban transport control, environmental measurement of weather and the like, healthcare and crime prevention, and it is also possible to connect these sensors to the present system. Note that the sensor network system may be constituted by only one type of sensor, or may be constituted by a plurality of types of sensors.

Virtual sensors are constituted by a combination of one or more original sensors (sensors from which input sensing data is acquired) and a virtual sensor function which is a program that performs processing, analysis and the like of input sensing data. Original sensors may be real sensors or may be virtual sensors.

For example, assume that the information that a certain application server 12 needs is "the speed of vehicles passing along a road AB." If a speed sensor installed on the road AB exists among the real sensors connected to the sensor network, sensing data obtained with this speed sensor need only be provided to the application server 12. However, it can be the case that a real sensor that perfectly matches the requirements of the application server 12 does not exist. In such a case, if there are cameras installed at each of an intersection A on the entrance-side and an intersection B on the exit-side of the road AB, the time taken for a car to move from the intersection A to the intersection B and the distance between the intersections A and B can be calculated on the basis of image data and time information obtained from each of the entrance-side camera and the exit-side camera and the position information of each camera, and the speed of the car can be estimated from the calculation results. That is, a virtual sensor that realizes a function equivalent to a vehicle speed sensor can be created, using the cameras installed at each of the intersections A and B and a virtual sensor function. Note that it is possible to create various types of virtual sensors other than that illustrated here. That is, any module that provides a function of generating data having a different value (new value) to the original input sensing data from one or a plurality of input sensing data and outputting the generated data can be called a virtual sensor, and various virtual sensors can be constructed contingent on the idea.

As evident from the above example, by enabling use of virtual sensors in the present system, various effects can be expected, such as improvement in the utilization rate of resources (real sensors) of sensor networks and provision of sensing data having new value.

Sensor Network Adaptor

The sensor network adaptor 11 is an apparatus that is communicably connected to one or a plurality of sensors 10 in a wireless or wired manner, and performs processing such as management of the sensors 10, acquisition of sensing data from the sensors 10, and transmission of sensing data to the sensor network system and applications. The sensor network adaptor 11 may also have a function of performing predetermined processing on sensing data (signal processing such as noise reduction, computational processing such as averaging, sampling, data compression, time stamping, etc.). The sensor network adaptor 11 has a function of communicating with external apparatuses, and is able to communicate with the application servers 12, the sensor network server 14 and the like via a network.

Devices such as smartphones, tablet terminals, mobile PCs, drones and wearable terminals incorporate sensors such as image sensors, GPS sensors, acceleration sensors and microphones, and have a function of processing and outputting data obtained by the sensors and a network communication function. Accordingly, these devices are examples of devices in which the sensors 10 and the sensor network adaptor 11 are physically integrated. Note that, in the case where the sensors 10 incorporate a communication function, the sensors 10 are connectable to the sensor network system in a stand-alone manner (i.e., not via the sensor network adaptor 11).

Application Servers

The application servers 12 are server devices in which various applications that use sensing data to provide services are installed. The application servers 12 can be constituted by a general-purpose computer that is provided with a CPU (processor), a memory, an auxiliary storage device (HDD, etc.), a communication device, an input device, a display device and the like. The application servers 12 are installed by users of sensing data, and various applications are envisaged according to the application/purpose thereof.

As an example of an application, an application that collects traffic conditions at various spots from sensors installed on roads or from in-vehicle terminals mounted in vehicles that travel along the road or the smartphones of drivers to generate a traffic congestion map, and provides the generated traffic congestion map to a business operator or the like that uses traffic congestion information is conceivable. Additionally, applications such as a video delivery application that collects image data captured during travel with smartphones, in-vehicle cameras and the like and provides the collected image data to users who wants to know the situation at various spots, a route search application that searches for travel routes for vehicles on the basis of traffic congestion information or the like, an application that estimates statistical data of attributes (sex, age group, etc.) of passersby from video of cameras installed in specific places and provides the estimated statistical data as data for various studies, and an application for a sensor manufacturer to perform online maintenance of sensors sold by the sensor manufacturer are conceivable.

Sensor Network Server

The sensor network server 14 is a server device that administers processing such as matching of providers and users of sensing data and dataflow control of sensing data from providers to users, and is a specific example of a dataflow control apparatus according to the present invention. The sensor network server 14 can also be constituted by a general-purpose computer that is provided with a CPU (processor), a memory, an auxiliary storage device (HDD, etc.), a communication device, an input device, a display device and the like. The various functions of the sensor network server 14 which will be discussed later are realized by the CPU executing required programs.

The sensor network system is a system that networks a large number (or various types) of sensors, and enables collection and use of sensing data, and, in the present embodiment, a mechanism in which data providers (sensors 10) provide sensing data to data users (application servers 12) and obtain compensation is envisaged. Thereby, the advantage for data providers is the opportunity for profit, and the advantage for users is cheap data acquisition. The sensor network server 14 is a server device that mediates such transactions of sensing data, and is configured to match data providers and data users and realize appropriate distribution of sensing data.

Incidentally, it is not realistic to extract data matching the desired conditions of data users from a huge amount of sensing data, when matching data providers and data users. In view of this, in the present system, sensor-side metadata describing specifications, provision conditions and the like of sensing data is prepared for all sensors (including real and virtual sensors) registered in the sensor network, and app-side metadata describing requirement specifications, utilization conditions and the like of sensing data is also used for applications which are data users. Appropriate matching of data providers (sensors) and users (applications) is then performed through comparison of both metadata.

In the exemplary system configuration of FIG. 1, the sensor network server 14 has an app-side metadata DB (Database) 140, a sensor-side metadata DB 141, a matching unit 142, and a dataflow control unit 143. The app-side metadata DB 140 is a storage unit that stores app-side metadata received from the application servers 12. The sensor-side metadata DB 141 is a storage unit that stores sensor-side metadata for all of the sensors that are registered in the sensor network. The matching unit 142 is a function that matches app-side metadata and sensor-side metadata, and extracts sensors capable of providing sensing data that satisfies the requirements of an application. The dataflow control unit 143 is a function that generates dataflow control commands that instruct transmission of sensing data, based on the matching result of the matching unit 142, and transmits the generated dataflow control commands. These functions will be discussed in detail later.

Sensor-Side Metadata

Sensor-side metadata is metadata describing information such as attribute information of a sensor, information indicating the specifications of sensing data that the sensor is capable of providing, and information indicating the provision conditions of the sensing data. The attribute information of a sensor desirably includes an ID specifying the sensor, information (called the sensor class) showing whether the sensor is a real sensor or a virtual sensor, the type of sensor, a network address of the sensor, and an operation history of the sensor, for example. An IP address, a MAC (Media Access Control) Address or a URI (Uniform Resource Identifier), for example, can be used for the network address. In the case where a sensor is connected to the network via the sensor network adaptor 11, the network address of the sensor network adaptor 11 need only be set, and, in the case of a virtual sensor, the network address of a computer that executes the virtual sensor function and generates virtual sensing data need only be set. The information indicating the specifications of sensing data desirably includes the sensing object (i.e., what is being sensed), the area in which sensing is performed (e.g., position, range, etc.), the sensing time (time of day or time slot that sensing data is acquirable), the data type of the sensing data (e.g., image, moving image, temperature, etc.), the data format (e.g., JPEG, text, etc.), sensing conditions (e.g., shutter speed, resolution, sampling period, etc.) and data reliability, for example. The information indicating the provision conditions of sensing data is information indicating the transaction conditions sought by a data provider, and desirably includes an ID specifying the data provider, compensation (provision price of data), and the range/purpose of use (e.g., unavailable for commercial use, available for secondary use, etc.), for example.

Furthermore, sensor-side metadata is capable of describing information (hereinafter, "data history information") indicating the history of sensing data. Data history information is information indicating the derivation, sequence, source, origin, extraction, history, formation, person-in-charge and the like of the sensing data, and may be any information that can serve as objective material for judging criteria such as the accuracy, quality, reliability and security of sensing data.

Information that can preferably be used as data history information includes, for example, information specifying the manufacturer or the seller of the sensor (manufacturer name, manufacturer ID, seller name, seller ID, etc.), information specifying the make or model of the sensor (model name, model number, etc.), information specifying the owner or administrator of the sensor (owner name, owner ID, administrator name, administrator ID, etc.), and information specifying the provider of the data (provider name, provider ID, etc.). Since the accuracy and characteristics of sensing data are considered to be greatly affected by the performance of the sensor, information such as the manufacturer, the seller, the make and the model of the sensor is helpful in judging the reliability of sensing data. That is, in the case where a certain level of trust has been established in the manufacturer or seller of a sensor or a model of sensor, that trust serves as an assurance of the reliability of sensing data. Also, from the viewpoint of the quality assurance of sensing data (e.g., whether sensing data in line with defined specifications is provided, whether there is anything fraudulent about the data such as tampering, or whether there is any backup if there happens to be a defect in the data), criteria such as how good or bad the organization, administration, management and maintenance on the data provider-side are also exert an influence, and thus information about parties such as the owner or administrator of the sensor or the data provider is also helpful in judging the reliability of sensing data.

Also, data history information may include certification information certifying that sensing data conforms to a predetermined standard. Preferably, for example, countries, governments, industry groups, standards bodies and the like define standards regarding criteria such as the accuracy, quality, transaction security and reliability of sensing data, and only accept the addition of such certification information with respect to sensing data that has passed a standard conformance test implemented by a third party certificate authority. At this time, a digital certificate that is issued by the third party certificate authority is desirably added to the data history information as certification information. By using such certification information, the fact that the sensing data meets a predetermined standard in terms of criteria such as accuracy and quality can be objectively certified or assured, thus enabling the security and reliability of data transactions to be improved. Note that certification information of the sensor, certification information of the data provider or certification information of the owner or administrator of the sensor may be used, rather than certification information of the sensing data itself. That is, trust established by the fact that the sensor, the data provider or the owner or administrator of the sensor conforms to a predetermined standard serves as assurance of the reliability of the sensing data that is provided therefrom.

A number of examples of data history information have been illustrated, and the information that is added to metadata may include some or all thereof. FIG. 2A shows an example of a sensor-side metadata management table that is stored in the sensor-side metadata DB 141. In the example of FIG. 2A, the sensor-side metadata of real sensors R001 and R002 and a virtual sensor V001 is shown. In this example, the manufacturer name and the model name of the sensor are used as data history information. Here, the data history information of the metadata of the original sensor of the original sensor is a virtual sensor, then the original sensor of that virtual sensor) is inherited by the data history information of the metadata of the virtual sensor V001. The derivation of data that the virtual sensor used to generate virtual sensing data is thereby apparent, and is helpful for judging the reliability of the virtual sensing data.

App-Side Metadata

App-side metadata is metadata describing attribute information of an application, information indicating the specifications (requirement specifications) of sensing data that the application requires, information indicating the utilization conditions of the sensing data, and the like. The attribute information of an application desirably includes an ID specifying the application, the type of application and a network address of the application, for example. An IP address, a port number or the like, for example, can be used for the network address. The information indicating the requirement specifications of sensing data desirably includes the sensing object, the area in which sensing is performed, the sensing time, the data type of sensing data, the data format, sensing conditions and data reliability, for example. The information indicating utilization conditions is information indicating transaction conditions sought by a data user, and desirably includes an ID specifying the data user, compensation (upper limit for utilization price of data) and the range/purpose of use, for example. Note that items with respect to which there is no particular specification of conditions need only be left blank (not specified).

Data history information can also be described in app-side metadata. Since the contents of the data history information are the same as the information described in the sensor-side metadata, description thereof will be omitted. A difference, however, lies in the fact that the sensor-side metadata describes data history information regarding the sensing data that is provided, whereas the app-side metadata describes data history information that is required by the application. Accordingly, the app-side metadata is able to describe a plurality of data history information that the application allows.

FIG. 2B shows an example of an app-side metadata management table (also called a cue table) that is stored in the app-side metadata DB 140. In the example of FIG. 2B, app-side metadata respectively received from two applications A001 and A002 is shown. The application A001 does not designate data history information (i.e., data of any history is allowed). The app-side metadata of the application A002 is an example in which one of model name aa1 from A company, model name aa2 from A company and model name bb1 from B company is sought as the data history.

Registration of Metadata

FIG. 3A is an example of a metadata creation GUI (Graphical User Interface) that is displayed on the computer of a data provider, when the data provider newly registers sensor-side metadata to the sensor-side metadata DB 141 of the sensor network server 14. Note that FIG. 3A selectively shows only the setting screen for data history information out of the metadata creation GUIs. In this example, the name "A company" of the manufacturer of the sensor, the model "aa1" of the sensor, the name "O company" of the provider of the data, the issuer "CA certificate authority" of the digital certificate, the digital certificate "abcdef" and the valid to date "2015/11/09" of the digital certificate have been set as data history information.

FIG. 3B is an example of a metadata creation GUI displayed on the computer of a data user, when the data user newly creates app-side metadata. Note that FIG. 3B selectively shows only the setting screen for data history information out of the metadata creation GUIs. The difference from the setting screen (FIG. 3A) for sensor-side metadata is that a plurality of options can be set for each item and the setting "not specified" (i.e., all options are acceptable) is possible. The data user is able to enhance the possibility of matching the data history information of a data provider, by broadly setting the options for each item. In the example of FIG. 3B, "A company" and "B company" are set as the names of sensor manufacturers, and "aa1 from A company", "bb2 from B company", and "bb3 from B company" are set as models of sensors, and data provider is set to "not specified" (i.e., all data providers are acceptable). Also, a digital certificate is "mandatory" and the issuer is set to "not specified" (i.e., all issuers are acceptable).

By providing input support to the user through the metadata creation GUIs mentioned above, setting of the data history information of metadata is facilitated, and improvement in convenience for both data providers and data users can be attained.

Matching and Dataflow Control

Figure 4:
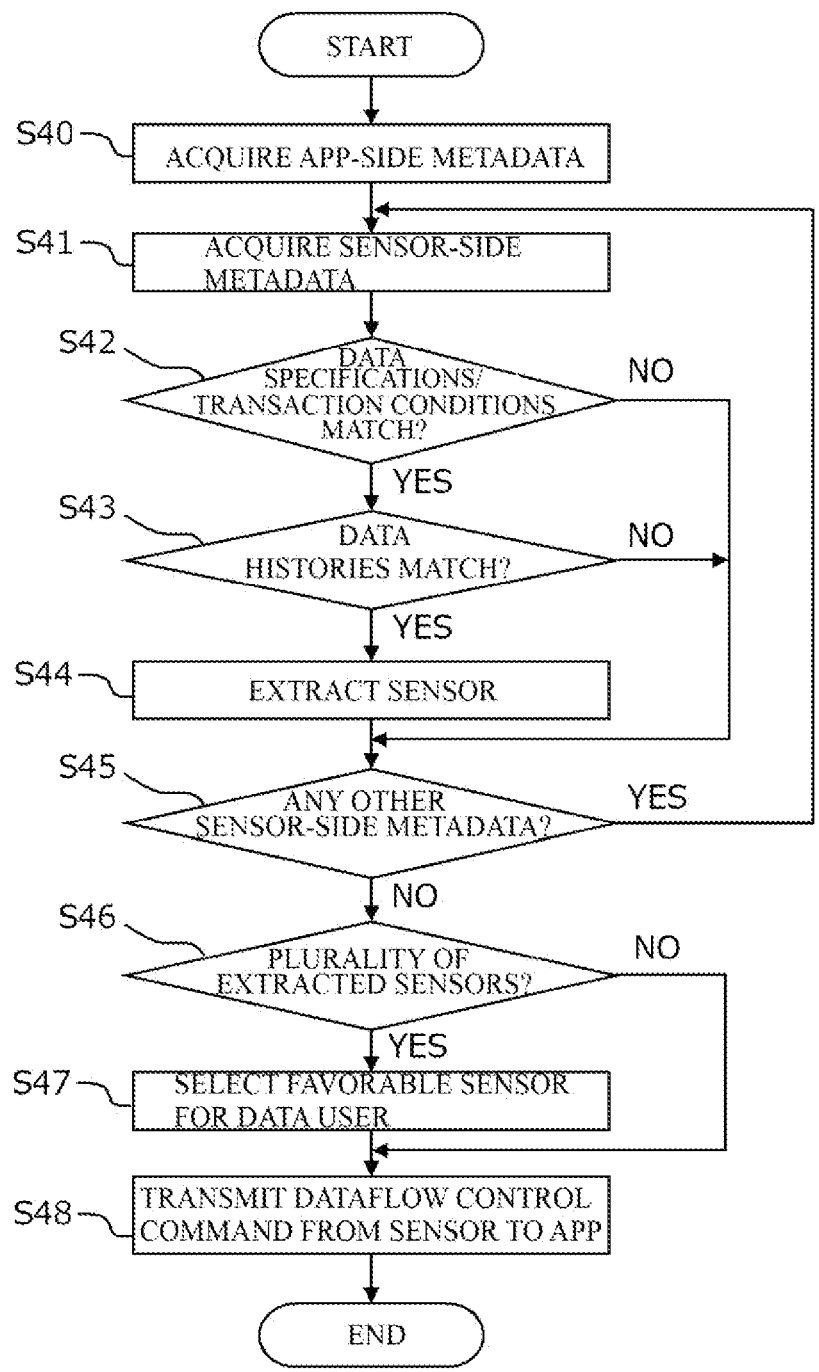
FIG. 4 is a flowchart of matching and dataflow control by a sensor network server.

Next, matching and dataflow control processing will be described using FIGS. 1 and 4. Here, exemplary processing in which the sensor network server 14 matches app-side metadata and sensor-side metadata and issues a dataflow control command for flowing sensing data from an appropriate sensor to an application, triggered by the sensor network server 14 receiving app-side metadata transmitted from the application server 12, will be described.

The application server 12 transmits a sensing data request together with app-side metadata, using a predetermined API (Application Programming Interface) of the sensor network server 14. The sensor network server 14, upon receiving the sensing data request, records the app-side metadata included in the request to the app-side metadata management table (see FIG. 2B) of the app-side metadata DB 140. The matching unit 142 then acquires pending app-side metadata from the app-side metadata management table one at a time (step S40).

The matching unit 142 acquires one sensor-side metadata from the sensor-side metadata management table (see FIG. 2A) within the sensor-side metadata DB 141 (step S41), and determines whether the specifications and transaction conditions (provision conditions) of the sensing data defined by the sensor-side metadata satisfy the requirement specifications and transaction conditions (utilization conditions) of the sensing data defined by the app-side metadata (step S42). Furthermore, the matching unit 142 determines whether the data history information defined by the sensor-side metadata satisfies the data history information defined by the app-side metadata (step S43). If it is determined in the affirmative for both steps S42 and S43, the corresponding sensor is extracted as one candidate (step S44). Note that the order of the determination processing of steps S42 and S43 may be reversed. Also, if data history information is not included in the app-side metadata, step S43 need only be skipped. The processing of steps S41 to S44 is executed for all of the sensor-side metadata that is registered in the sensor-side metadata management table (step S45).

If there are a plurality of sensors extracted as candidates (YES in step S46), the matching unit 142 selects the sensor that is most advantageous to the data user from that plurality of candidates (step S47). For example, in the case of prioritizing compensation, the sensor with the cheapest data price need only be selected, and, in the case of prioritizing quality, the sensor with the highest data accuracy and quality need only be selected. The basis for selecting the sensor most advantageous to the data user may be set in the app-side metadata. Note that, in the case where not even one sensor is extracted as a candidate, the processing may be ended, or sensing data with the closest data specifications, transaction conditions and data history information may be recommended to the data user.

Lastly, the dataflow control unit 143 generates a dataflow control command instructing transmission of sensing data from the sensor selected in step S47 to an application, and transmits this dataflow control command to the sensor 10 or the sensor network adaptor 11 that manages this sensor 10 (step S48). Then, as shown by the dashed line arrow in FIG. 1, the sensor network adaptor 11, based on the dataflow control command, acquires required sensing data from the sensor 10, and transmits the acquired sensing data to the application server 12.

FIG. 5 shows an example of the dataflow control command in this case. The dataflow control command desirably includes a dataflow control command ID (Identification), information specifying the sensor (sensor ID and network address of sensor), information specifying the app (app ID and network address of app) and time information for performing data transmission.

According to the configuration of the present embodiment described above, metadata is capable of describing data history information, and this data history information can be used as one item for matching data providers and data users. Knowledge of information such as the derivation, development and source of the data, for example, obtained from the data history information serves as effective material for data users when judging criteria such as the accuracy, quality, reliability and security of the data. On the other hand, for data providers, by disclosing the data history information, there is the advantage of being able to assure criteria such as the accuracy, quality, reliability and security of the data, and enhance the commodity value of the data. Accordingly, by using metadata describing data history information, the accuracy and quality of data transacted in a data distribution market can be assured, and the security and reliability of data transactions can be improved.

Note that the configuration of the embodiment described above is merely a specific example of the present invention, and is not intended to limit the scope of the invention. The present invention can take various specific configurations that do not depart from the technical concept of the invention. For example, the data structure and table structure shown in the above embodiment are examples, and items may be appropriately added or replaced. Also, although, in the above embodiment, distribution of sensing data in a sensor network was illustrated, the present invention is also applicable to distribution of data in a device network that includes devices other than sensors. In that case, the basic configuration of the system will be similar to that of the above embodiment, and "device" need only be read for "sensor" and "data" need only be read for "sensing data" in the above embodiment.

The technical concept disclosed in this specification can also be specified as inventions such as the following.

Supplementary Remark 1

A dataflow controller having a memory and at least one hardware processor connected to the memory,
  the memory having:
    a device-side metadata storage unit configured to store, for each of a plurality of devices, device-side metadata including information that indicates a specification of data that the device provides and capable of describing information indicating a history of the data that the device provides; and
    an app-side metadata storage unit configured to store, for an application that uses data to provide a service, app-side metadata including information that indicates a specification of data that the application requires and capable of describing information indicating a history of the data that the application requires, and
  the at least one hardware processor being configured to:
    match the app-side metadata and the device-side metadata,
    in a case where the information indicating the history is described in the app-side metadata, extract a device capable of providing data that satisfies at least both the specification and the history that the application requires from among the plurality of the devices, and perform dataflow control that provides data that is output from the extracted device to the application.

Supplementary Remark 2

A dataflow control method including:
  acquiring, for each of a plurality of devices, device-side metadata including information that indicates a specification of data that the device provides and capable of describing information indicating a history of the data that the device provides, from a device-side metadata storage unit configured to store the device-side metadata, using at least one hardware processor;
  acquiring, for an application that uses data to provide a service, app-side metadata including information that indicates a specification of data that the application requires and capable of describing information indicating a history of the data that the application requires, from an app-side metadata storage unit configured to store the app-side metadata, using the at least one hardware processor;
  matching the app-side metadata and the device-side metadata, using the at least one hardware processor;
  in a case where the information indicating the history is described in the app-side metadata, extracting a device capable of providing data that satisfies at least both the specification and the history that the application requires from among the plurality of the devices, using the at least one hardware processor; and
  performing dataflow control that provides data that is output from the extracted device to the application, using the at least one hardware processor.

INDEX TO THE REFERENCE NUMERALS

10: Sensor
11: Sensor network adaptor
12: Application server
14: Sensor network server
140: App-side metadata DB
141: Sensor-side metadata DB
142: Matching unit
143: Dataflow control unit

The invention claimed is:

1. A dataflow control apparatus comprising a processor configured with a program to perform operations comprising:
  operation as a device-side metadata storage unit configured to store, for each of a plurality of devices, device-side metadata comprising at least information that indicates a specification of data that the respective device provides, and information indicating a history of the data provided by the respective device, the information indicating the history of the data provided by the respective device comprising information identifying a seller of the respective device;
  operation as an app-side metadata storage unit configured to store, for an application that uses data to provide a service, app-side metadata comprising at least information that indicates a specification of device data that the application requires, information indicating a history of the device data that the application requires, and a device selection priority basis;
  operation as a matching unit configured to extract devices from among the plurality of the devices, capable of providing data that satisfies the specification of the device data that the application requires, by matching the app-side metadata and the device-side metadata, and the history of the device data that the application requires;
  selecting, in response to extracting devices from among the plurality of the devices capable of providing data that satisfies the specification of the device data that the application requires, a device from among the extracted devices that satisfies the device selection priority basis in the app-side metadata; and operation as a dataflow control unit configured to perform dataflow control that provides data output from the selected device to the application, based on a result of the matching by the matching unit, wherein the device selection priority basis comprises one of: a data price of sensor data; and a data accuracy of sensor data.

2. The dataflow control apparatus according to claim 1, wherein the information indicating the history of the data provided by the respective device includes at least any of information specifying a manufacturer of the respective device that provides the data, information specifying a make or a model of the respective device that provides the data, and information specifying an owner or an administrator of the respective device that provides the data.

3. The dataflow control apparatus according to claim 2, wherein the information indicating the history of the data provided by the respective device includes certification information certifying that the data provided by the respective device, the respective device that provides the data, a provider of the data provided by the respective device, or an owner or an administrator of the respective device that provides the data conforms to a predetermined standard.

4. The dataflow control apparatus according to claim 2, wherein the selected device comprises a sensor configured to output sensing data.

5. The dataflow control apparatus according to claim 1, wherein the information indicating the history of the data provided by the respective device includes certification information certifying that the data provided by the respective device, the respective device that provides the data, a provider of the data provided by the respective device, or an owner or an administrator of the respective device that provides the data conforms to a predetermined standard.

6. The dataflow control apparatus according to claim 5, wherein the certification information is a digital certificate issued by a third party certificate authority.

7. The dataflow control apparatus according to claim 5, wherein the selected device comprises a sensor configured to output sensing data.

8. The dataflow control apparatus according to claim 1, wherein the selected device comprises a sensor configured to output sensing data.

9. A dataflow control method comprising:

acquiring, by a computer, for each of a plurality of devices, device-side metadata including at least information that indicates a specification of data that the respective device provides, and information indicating a history of the data provided by the respective device, the information indicating the history of the data provided by the respective device comprising information identifying a seller of the respective device;

acquiring, by the computer, for an application that uses data to provide a service, app-side metadata comprising at least information that indicates a specification of device data that the application requires, information indicating a history of the device data that the application requires, and a device selection priority basis;

extracting, by the computer, from among the plurality of the devices, devices capable of providing data that satisfies the specification of the device data that the application requires, by matching the app-side metadata and the device-side metadata, and the history of the device data that the application requires;

selecting, in response to extracting devices from among the plurality of the devices capable of providing data that satisfies the specification of the device data that the application requires, a device from among the extracted devices that satisfies the device selection priority basis in the app-side metadata; and performing, by the computer, dataflow control that provides data output from the selected device to the application, based on a result of the matching, wherein the device selection priority basis comprises one of: a data price of sensor data; and a data accuracy of sensor data.

10. A non-transitory computer-readable medium storing a program configured to cause a computer to execute operations comprising:

acquiring, for each of a plurality of devices, device-side metadata including at least information that indicates a specification of data that the respective device provides, and information indicating a history of the data provided by the respective device, the information indicating the history of the data provided by the respective device comprising information identifying a seller of the respective device;

acquiring, for an application that uses data to provide a service, app-side metadata comprising at least information that indicates a specification of device data that the application requires, information indicating a history of the device data that the application requires, and a device selection priority basis;

extracting, from among the plurality of the devices, devices capable of providing data that satisfies the specification of the device data that the application requires from among the plurality of devices, by matching the app-side metadata and the device-side metadata, and the history of the device data that the application requires;

selecting, in response to extracting devices from among the plurality of the devices capable of providing data that satisfies the specification of the device data that the application requires, a device from among the extracted devices that satisfies the device selection priority basis in the app-side metadata; and performing, dataflow control that provides data output from the selected device to the application, based on a result of the matching, wherein the device selection priority basis comprises one of: a data price of sensor data; and a data accuracy of sensor data.

* * * * *